United States Patent [19]
Ando

[11] Patent Number: 5,719,845
[45] Date of Patent: Feb. 17, 1998

[54] OPTICAL PICK-UP DEVICE COMPOSED OF COMPOSITE PRISM MADE OF UNIAXIAL CRYSTAL AND NON-AXIAL CRYSTAL

[75] Inventor: Nobuhiko Ando, Tokyo, Japan

[73] Assignee: Sony Corporation, Tokyo, Japan

[21] Appl. No.: 633,567

[22] Filed: Apr. 17, 1996

[30] Foreign Application Priority Data

Apr. 18, 1995 [JP] Japan ................... 7-092833

[51] Int. Cl.$^6$ ................... G11B 7/08; G11B 7/135
[52] U.S. Cl. ................... 369/110; 369/112; 369/120; 369/44.23
[58] Field of Search ................... 369/110, 112, 369/44.23, 13, 44.12, 109, 44.37, 120

[56] References Cited

U.S. PATENT DOCUMENTS

| | | | |
|---|---|---|---|
| 5,428,596 | 6/1995 | Hineno et al. | 369/110 |
| 5,508,992 | 4/1996 | Hirose et al. | 369/109 |
| 5,523,994 | 6/1996 | Ando et al. | 369/112 |
| 5,579,291 | 11/1996 | Matsumoto | 369/112 |

FOREIGN PATENT DOCUMENTS

| | | | |
|---|---|---|---|
| 0 576 072 A1 | 12/1993 | European Pat. Off. | G02B 27/28 |
| 0 608 151 A2 | 7/1994 | European Pat. Off. | H02M 3/07 |

*Primary Examiner*—David C. Nelms
*Assistant Examiner*—Kim-Kwok Chu
*Attorney, Agent, or Firm*—Limbach & Limbach L.L.P.

[57] ABSTRACT

The present invention provides an optical pick-up device comprising a composite prism in which a prism made of non-axial crystal and a prism made of uniaxial crystal are adhered to each other and a grating, and separating into an extraordinary ray and an ordinary ray by means of the prism made of the uniaxial crystal, and further diffracting each of the extraordinary ray and the ordinary ray to o order ray, + primary ray and − primary ray by means of the grating, and then carrying out an optical detection based on the above mentioned diffracted light.

14 Claims, 12 Drawing Sheets

OPTICAL PICK-UP DEVICE COMPOSED OF COMPOSITE PRISM MADE OF UNIAXIAL CRYSTAL AND NON-AXIAL CRYSTAL

BACKGROUND OF THE INVENTION

1. Field of the Invention

The present invention relates to an optical pick-up device used for a magneto-optic disk device and an optical disk device and the like, more specifically aims to reduce a number of the parts and shorten the length of an optical path in an optical system by using a composite prism composed of two prisms, a polarization film and a grating.

2. Background of the Invention

Generally, an optical pick-up device used for a magneto-optic disk device and an optical disk device and the like, is provided with an optical system for detecting an RF signal from a recording medium, an optical system for detecting a focus error, and an optical system for detecting a tracking error.

In the above-mentioned optical system of the optical pick-up device, for example, as shown in FIG. 1, an optical system is arranged on a going path for inputting a light to a recording medium 2. The optical system arranged on the going path is constituted by a light source 1 for a laser light, and a collimator lens 3 arranged on an optical axis connecting the light source 1 and the recording medium 2, a first polarization beam splitter 4 and a first convex lens 5. Then, the light emitted from the light source 1 is collimated by the collimator lens 3, transmitted through the first polarization beam splitter 4, inputted to the first convex lens 5, and converged on the recording medium 2 by the first convex lens 5.

Further, in the optical system of the optical pick-up device, an optical system is arranged on a returning path for detecting the return light reflected by the recording medium 2. The optical system arranged on the returning path aims to detect the return light from the recording medium 2, which is taken out from the first polarization beam splitter 4. On an optical axis of the return light reflected on the first polarization beam splitter 4 are disposed a half wave plate 6, a second convex lens 7, a concave lens 8, a second polarization beam splitter 9, and further a two-divided photo detector 10 for detecting the light which is transmitted through the second polarization beam splitter 9, and a four-divided photo detector 12 for detecting the light reflected on the second polarization beam splitter 9 through a cylindrical lens 11.

The return light reflected on the first polarization beam splitter 4, after the polarization plane is rotated by 45 degrees by the half wave plate 6, is converged at a predetermined focal length by the second convex lens 7 and the convex lens 8, and inputted to the second polarization beam splitter 9. Then, the light transmitted from the second polarization beam splitter 9 is detected, as it is, by the two-divided photo detector 10. The light reflected from the second polarization beam splitter 9 causes astigmatism because of the cylindrical lens 11 and thereby is detected by the four-divided photo detector 12.

On this occasion, the two-divided photo detector 10 aims to detect a tracking error signal by means of a push-pull method, and the four-divided detector 12 aims to detect a focus error signal by means of an astigmatism method. Further, the four-divided photo detector 12 is used for detecting the RF signal from the recording medium 2.

In the above-mentioned optical pick-up device, for example, the cylindrical lens 11 is necessary for detecting the focus error signal. Further, the first convex lens and the concave lens need to be combined with each other, in order to increase a magnification when detecting the return light by means of the two-divided photo detector 10 and the four-divided photo detector 12, so that many parts are necessary. Then, since the producing cost becomes high as the number of the parts is increased, it is desirable to reduce the number of the parts.

Further, in the case where the first convex lens and the concave lens are combined with each other in such a way, the length of the optical path in the optical system on the returning path becomes excessively long. And, the excessively long optical path in the optical system disturbs miniaturization of the device. Therefore, the optical pick-up device which can constitute the optical system having the shorter optical path is desirable in order to miniaturize the device.

Moreover, as an optical pick-up device which can constitute an optical system having a small number of the parts and a short optical path, there is proposed a device employing a hologram optical element having a polarization selection property. However, the hologram optical element is inferior in an extinction ratio and inferior in mass productivity, so that there is still a problem, when actually using the device employing such a hologram optical element. Furthermore, the device employing the hologram optical element does not have a polarization beam splitter and so does not have the enhancing effect. As a result, signal performance such as C/N ratio or the like, is degraded compared with the case in which a polarization beam splitter is used as mentioned above.

The present invention is proposed in view of the above mentioned circumstances. It is therefore an object of the present invention to provide an optical pick-up device which constitutes an optical system having a small number of parts and a short optical path without employing a hologram optical element.

SUMMARY OF THE INVENTION

The present invention provides to an optical pick-up device for radiating an optical beam onto a recording medium and detecting the return light reflected from the recording medium and thereby reading out a signal from the recording medium, including a light emitting section for emitting a laser light, a first optical element made of non-axial crystal material to which the light emitted from the light emitting section is inputted, a second optical element made of uniaxial crystal material adhered to the first optical element through a polarization film, a first detector for detecting the light passed through the second optical element, after the light emitted from the light emitting section is reflected on the polarization film through the first optical element, and the light reflected on the polarization film is radiated onto the recording medium, and the light reflected from the recording medium is inputted again to the first optical element and is also transmitted through the polarization film and inputted to the second optical element; a grating disposed on an optical path of the light reflected from the recording medium; and a second detector wherein the light emitted from the light emitting section is passed through the first optical element and the light transmitted through the polarization film is radiated through the second optical element.

Further, the present invention provides an optical pick-up device for radiating an optical beam onto a recording medium and detecting the return light reflected from the recording medium and thereby reading out a signal from the recording medium, including a light emitting section for emitting a laser light; a first optical element made of non-axial crystal material to which the light emitted from the light emitting section is inputted; a second optical element made of uniaxial crystal material adhered to the first optical element through a polarization film; a grating for diffracting an extraordinary ray and an ordinary ray, after the light reflected on the polarization film through the first optical element is radiated onto the recording medium, and also the light reflected from the recording medium is inputted again to the polarization film through the first optical element, and transmitted through the polarization film and inputted to the second optical element, and then separated into the extraordinary ray and the ordinary ray through the second optical element; a first detector for detecting a 0 order ray, a + primary ray and a − primary ray which are diffracted through the grating; and a second detector wherein the light emitted from the light emitting section is radiated through the first optical element and the light transmitted through the polarization film is radiated through the second optical element.

The above and other objects, features and advantages of the present invention will become more apparent from the following detailed description with reference to the accompanying drawings.

DETAILED DESCRIPTION OF THE PREFERRED EMBODIMENTS

Actual embodiments in accordance with the present invention will be described in detail with reference to the drawings.

At first, an embodiment of a composite prism used in an optical pick-up device according to the present invention will be described hereinbelow.

Figure 1:
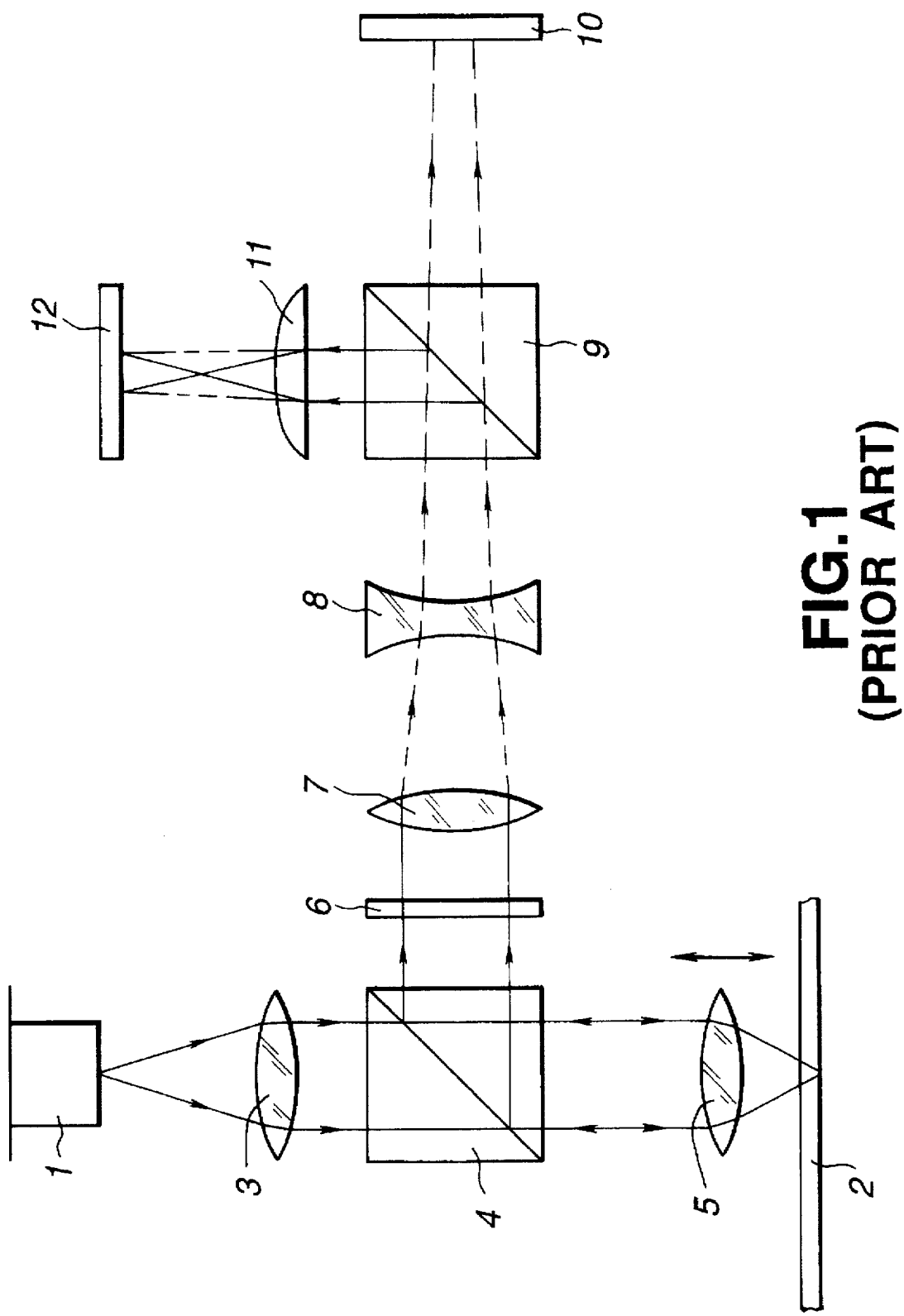
FIG. 1 is a side view of one constituent example according to a conventional optical pick-up device.
Figure 2:
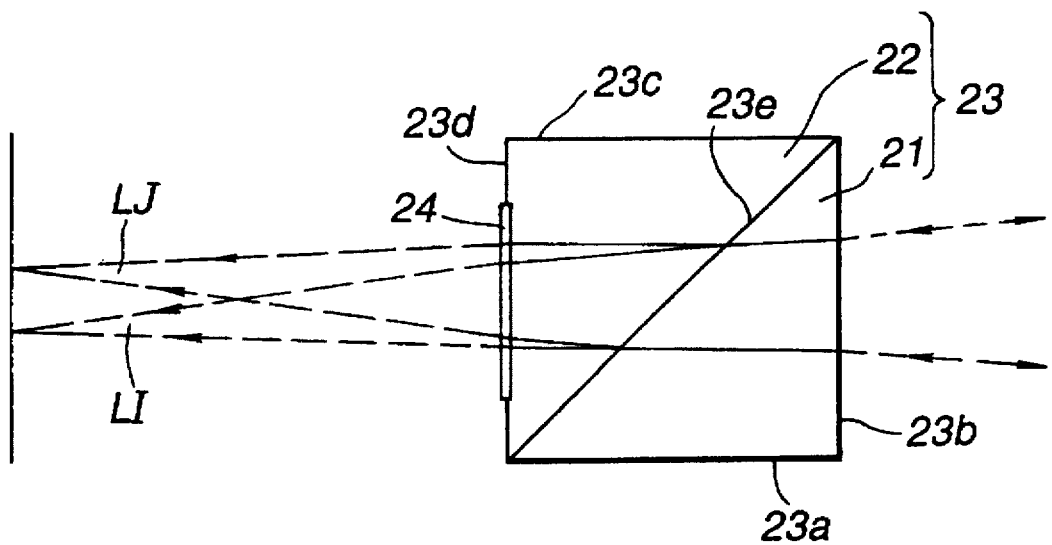
FIG. 2 is a side view of one example of a composite prism viewing from above of the prism.
Figure 3:
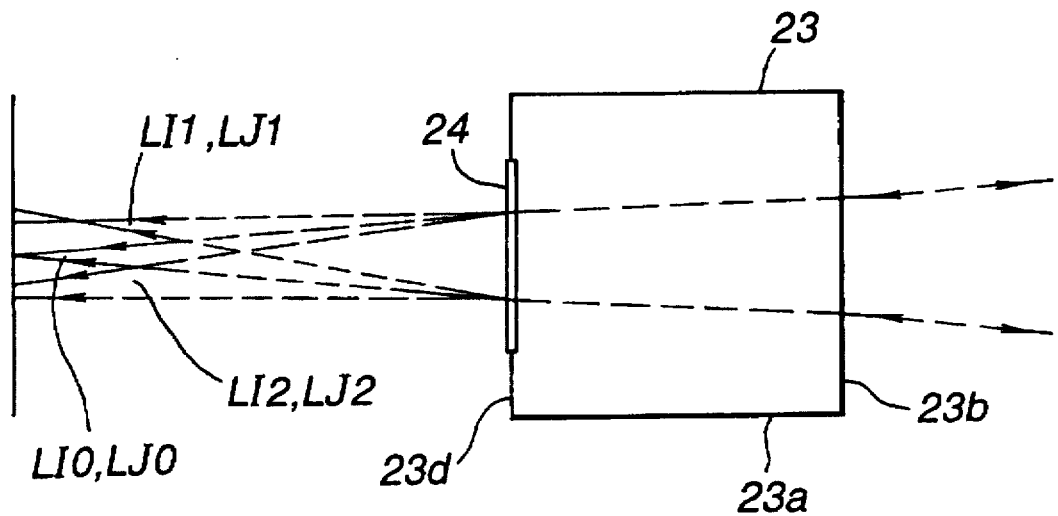
FIG. 3 is a side view of the composite prism shown in FIG. 2.

As shown in FIGS. 2 and 3, the composite prism of this embodiment comprises a coupled prism 23 in which a first rectangular prism 21 and a second rectangular prism 22 are adhered to each other through a polarization film 23e, and a grating 24 adhered to this coupled prism 23.

The first rectangular prism 21 mentioned above is made of non-axial crystal material such as glass and the like. On the other hand, the second rectangular prism 22 is substantially identical in shape with the first rectangular prism 21, and is made of uniaxial crystal material. A relation between a refractive index ng of the first rectangular prism 21, an ordinary ray refractive index n0 of the second rectangular prism 22 and an extraordinary ray refractive index ne of the second rectangular prism 22 is represented by the equation nO>ng>ne, or ne>ng>nO.

Then, the coupled prism 23 is made in such a manner that the first rectangular prism 21 and the second rectangular prism 22 are abutted to each other at their respective sloping surfaces through the polarization film 23e. Accordingly, the second coupled prism 23 is shaped in a substantially rectangular parallelepiped, and has a first plane 23a and a second plane 23b on a side of the first rectangular prism 21, and a third plane 23c and a fourth plane 23d on a side of the second rectangular prism 22.

Figure 4:
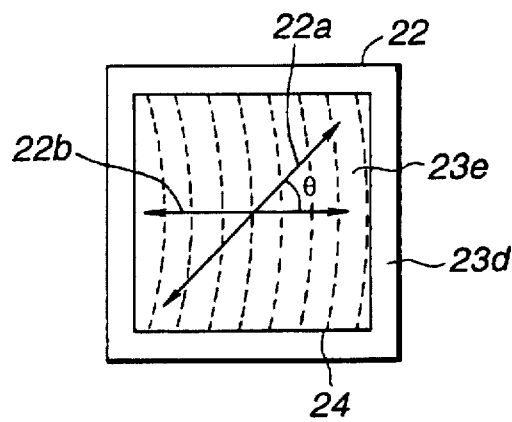
FIG. 4 is a diagrammatic view of the composite prism shown in FIG. 2, which shows a relation between a polarization direction due to the polarization film and an optical axis of a second prism.

The polarization film 23e interposed between the first rectangular prism 21 and the second rectangular prism 22 is composed of dielectric multi-layer. This polarization film 23e is arranged, as shown in FIG. 4 viewing this composite prism from a side of the fourth plane 23d, in such a manner that an angle θ contained by an optical axis 22a of the second rectangular prism 22 and a polarization direction 22b of the light inputted to the second rectangular prism 22 is 45 degrees when the light is transmitted through this polarization film 23e and inputted to the second rectangular prism 22.

Further, the grating 24 attached to the second rectangular prism 22 is attached on the fourth plane 23d of the coupled prism 23 to diffract the light emitted from the second rectangular prism 22.

In this composite prism, the light inputted from the second plane 23b gets the enhancing effect when transmitted through the polarization film, and then is separated into the ordinary ray LI and the extraordinary ray LJ by the second prism 22, as shown in FIG. 2. The ordinary ray LI and the extraordinary ray LJ are, as shown in FIG. 3, diffracted by the grating 24, and are separated respectively into 0 order rays LI0 and LJ0, + primary rays LI1 and LJ1 and − primary rays LI2 and LJ2. However, not less than ± secondary rays of the diffraction rays are neglected.

An embodiment of the optical pick-up device employing such a composite prism will be described hereinafter.

Figure 5:
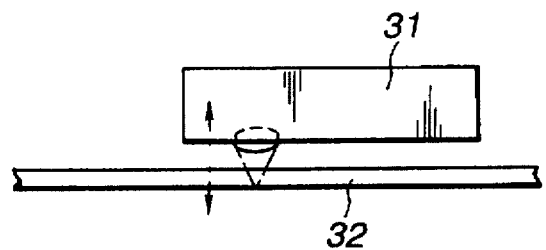
FIG. 5 is a diagrammatic side view of a main part of one example of the optical pick-up device and a recording medium according to the present invention.
Figure 6:
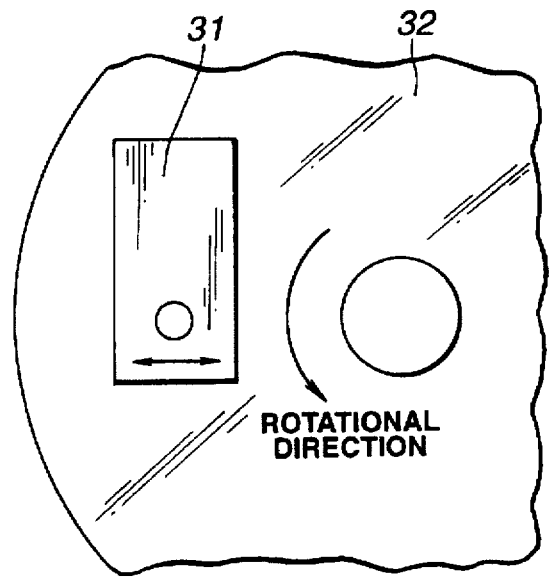
FIG. 6 is a diagrammatic side view of the main part of the optical pick-up device and the recording medium shown in FIG. 5.

As shown in FIGS. 5 and 6, an optical pick-up device 31 in accordance with the present embodiment is suitable for an magneto-optic disk device, an optical disk device or the like which inputs the light to a recording medium 32 such as a magneto-optic disk, an optical disk or the like and reads out the signal transmitted from the recording medium 32 based on the reflected light, and hence serves both as an optical system for detecting an RF signal emitted from the recording medium 32, as an optical system for detecting a focusing error, and as an optical system for detecting a tracking error.

Figure 7:
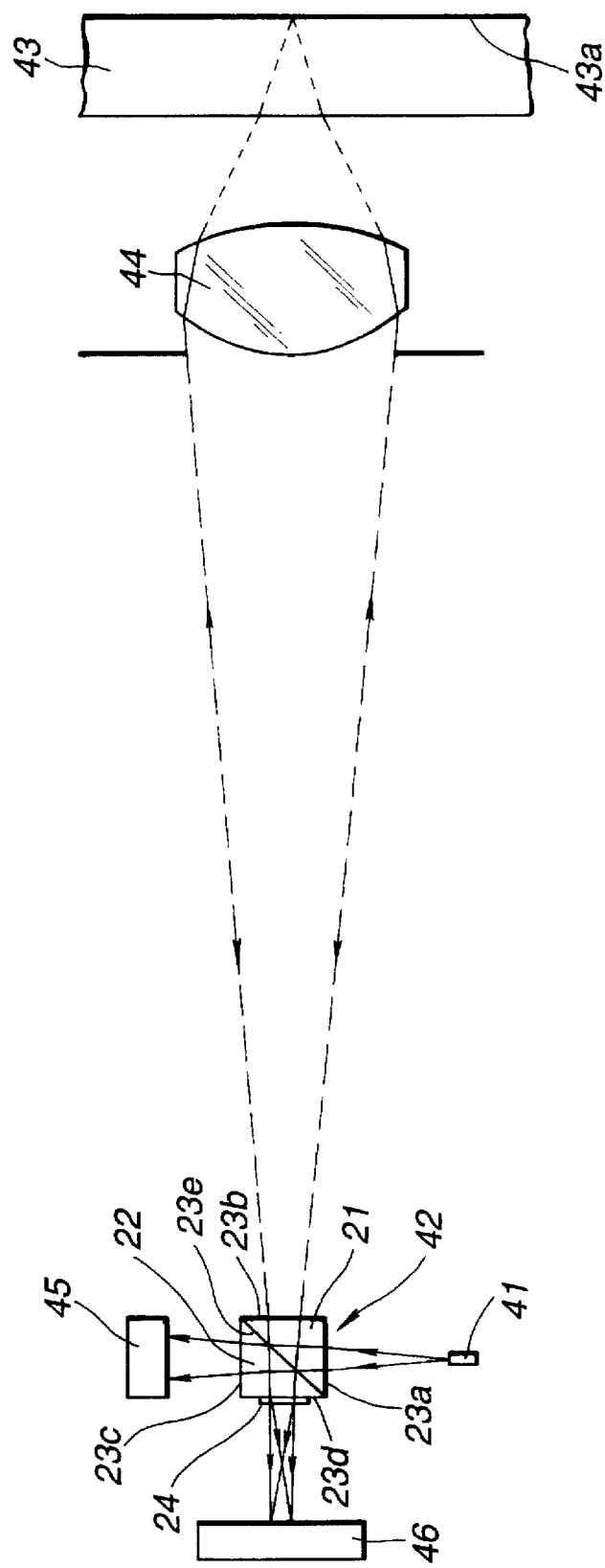
FIG. 7 is a side view showing one constituent example of the optical pick-up device according to the present invention.

This optical pick-up device comprises, as shown in FIG. 7, a light source 41 for emitting a laser light, a composite prism 42 arranged, as mentioned above, in such a manner that the laser light emitted from the light source 41 is inputted from the first plane 23a, a lens 44 for converging the light emitted from the second plane 23b of the composite prism 42 on the recording surface 43a of the recording medium 43, a first light detecting device 45 for detecting the light emitted from the third plane 23c of the composite prism 42, and a second light detecting device 46 for detecting the light emitted from the fourth plane 23d of the composite prism 42.

In this optical pick-up device, the laser light emitted from the light source 41 in order to read out the signal from the recording medium 43 is inputted from the first plane 23a to the composite prism 42, which separates the inputted laser light into the light which is reflected on polarization film surface 23e of the composite prism 42 and then emitted from the second plane 23b, and the light which is transmitted through the polarization film surface 23e of the composite prism 42 and then emitted from the third plane 23c.

The light emitted from the third plane 23c of the composite prism 42 is detected by the first light detecting device 45. The first light detecting device 45 is provided with a photo detector and is used to monitor power of the laser light emitted from the light source 41. That is, the first light detecting device 45 detects the quantity of the light emitted from the third plane 23c of the composite prism 42, and controls the power of the laser light emitted from the light source 41 based on the detected the quantity of the light, so that the power of the laser light can be always controlled at a suitable level.

On the other hand, the light emitted from the second plane 23b of the composite prism 42 is converged on the recording surface 43a of the recording medium 43 by the lens 44. The light inputted to the recording medium 43 as mentioned above is reflected from the recording medium 43 and returned again to the composite prism 42 through the lens 44. The return light which is reflected by the recording medium 43 as mentioned above is inputted to the composite prism 42 from the second plane 23b, and passed through the first prism, 21, the polarization film, the second prism 22 and the grating 24, and emitted from a side of the fourth plane 23d, and detected by the second light detecting device 46. As described later, a tracking direction of the recording medium 43 is perpendicular to a separating direction of the ordinary ray LI and the extraordinary ray LJ which are separated by the composite prism 42.

The light returning from the recording medium 43 gets the enhancing effect when transmitted through the polarization film, and separated into the ordinary ray LI and the extraordinary ray LJ by the second prism 22. The ordinary ray LI and the extraordinary ray LJ are diffracted by the grating 24 and separated into the 0 order rays LI0 and LJ0, the + primary rays LI1 and LJ1, and the − primary rays LI2 and LJ2. However, not less than ± secondary rays of the diffraction rays are neglected.

The light returning from the recording medium 43 is passed through the composite prism 42, and thereby separated into six rays including the 0 order ray LI0, the + primary ray LI1 and the − primary ray LI2 of the ordinary ray LI, and the 0 order ray LJ0, the + primary ray LJ1 and the − primary ray LJ2 of the extraordinary ray LJ. The separating direction of the ordinary ray LI and the extraordinary ray LJ and the direction diffracted by the grating 24 are perpendicular to each other in such a manner that the 0 order ray LJ0, the + primary ray LJ1 and the − primary ray LJ2 of the extraordinary ray LJ are emitted below the 0 order ray LI0, the + primary ray LI1 and the − primary ray LI2 of the ordinary ray LI, respectively. The separating direction of the ordinary ray LI and the extraordinary ray LJ corresponds to the tracking direction of the recording medium 43 as described above.

The second light detecting device 46 for detecting these six rays is arranged in such a manner that the 0 order rays LI0 and LJ0 are focused on the second light detecting device 46, the + primary rays LI1 and LJ1 are focused on a front side of the second light detecting device 46, and the − primary rays LI2 and LJ2 are focused on a rear side of the second light detecting device 46. However, it is allowable that the focusing positions of the + primary rays LI1 and LJ1 and the focusing positions of the − primary rays LI2 and LJ2 are set reversely. That is, it is allowable that the focusing positions of the − primary rays LI2 and LJ2 are set on the front side of the second light detecting device 46 and that the focusing positions of the + primary rays LI1 and LJ1 are set on the rear side of the second light detecting device 46.

Figure 8:
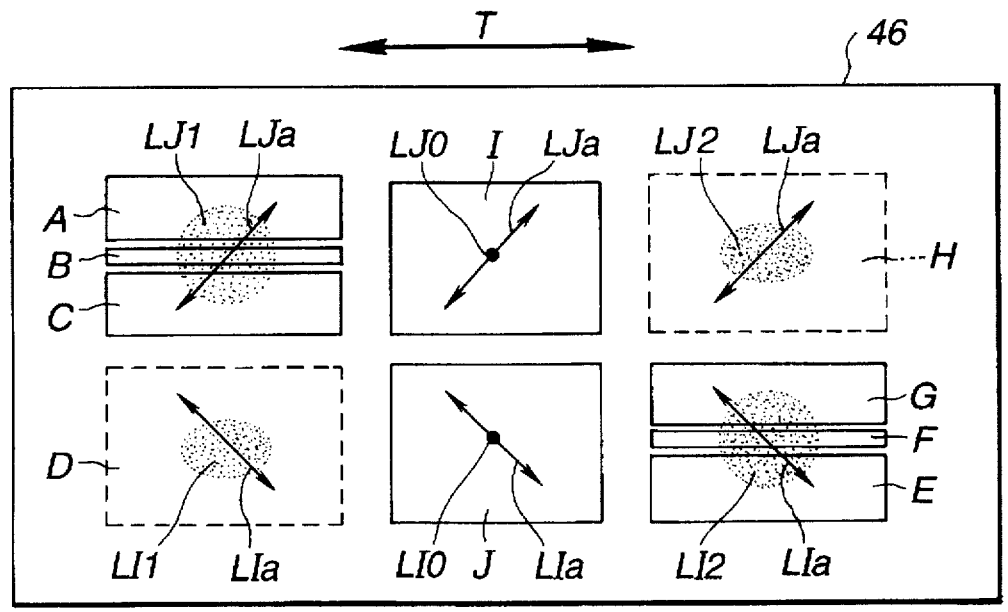
FIG. 8 is a plan view showing one example of a second light detecting device and a spot pattern.

As shown in FIG. 8, the second light detecting device 46 is composed of three-divided photo detectors A, B and C arranged on an optical axis of the + primary ray LJ1 of the extraordinary ray LJ for detecting the + primary ray LJ1 of the extraordinary ray LJ, a photo detector D arranged on an optical axis of the + primary ray LI1 of the ordinary ray LI for detecting the + primary ray LI1 of the ordinary ray LI, three-divided photo detectors E, F and G arranged on an optical axis of the − primary ray LI2 of the ordinary ray LI for detecting the − primary ray LI2 of the ordinary ray LI, a photo detector H arranged on an optical axis of the − primary ray LJ2 of the extraordinary ray LJ for detecting the − primary ray LJ2 of the extraordinary ray LJ, a photo detector I arranged on an optical axis of the 0 order ray LJ0 of the extraordinary ray LJ for detecting the 0 order ray LJ0 of the extraordinary ray LJ, and a photo detector J arranged on an optical axis of the 0 order ray LI0 of the ordinary ray LI for detecting the 0 order ray LI0 of the ordinary ray LI.

Further, FIG. 8 shows an example of a spot pattern and a polarization condition of each of the rays at the light receiving surface of the second light detecting device 46. That is, the spot pattern of each of the rays is shaped in a point for each of the 0 order rays LI0 and LJ0 of the ordinary ray LI and the extraordinary ray LJ, since they are focused on the light receiving surface of the photo detectors I and J, and is shaped in a predetermined expanse for each of the + primary rays LI1 and LJ1 and the − primary rays LI2 and LJ2 of the ordinary ray LI and the extraordinary ray LJ, since they are not focused on the light receiving surface of the photo detectors A, B and C, the photo detector D, the photo detectors E, F and G and the photo detector H. The polarization direction LIa for the ordinary ray LI and the polarization direction LJa for the extraordinary ray LJ are perpendicular to each other.

The three-divided photo detectors A, B and C for detecting the + primary ray LJ1 of the extraordinary ray LJ and the three-divided photo detectors E, F and G for detecting the − primary ray LI2 of the ordinary ray LI are arranged in such a manner that centers of the spots are positioned on the photo detector B and the photo detector F which are centered respectively, when the focusing and the tracking to the recording medium 43 are normal.

When the light quantities detected by the photo detectors A, B, C, D, E, F, G, H, I and J constituting the second light detecting device 46 are referred to as a, b, c, d, e, f, g, h, i and j, the RF signal from the recording medium 43, the focusing error signal and the tracking error signal are obtained as described below.

That is, the focusing error signal is obtained by the following equation (1).

$$\text{Focusing Error Signal} = (a+c-b)-(g+e-f) \quad (1)$$

Further, the tracking error signal is obtained by the following equation (2) as the push-pull signal.

$$\text{Tracking Error Signal} = (a-c)+(e-g) \quad (2)$$

When the magneto-optic disk and the like are used as the recording medium, and this optical pick-up device is applied to the magneto-optic disk device and the like for reading out the RF signal based on polarization condition of the light reflected from the recording medium, the magneto-optic signal which is a reconstruction signal is obtained as the difference between the light quantity of the ordinary ray LI and that of the extraordinary ray LJ in which the ordinary ray LI and the polarization direction are perpendicular to each other. Therefore, the magneto-optic signal can be obtained by the following equation (3).

$$\text{Optical-Magnetic Signal} = (i+h)-(i+d) \quad (3)$$

Further, when the magneto-optic disk and the like are used as the recording medium, and this optical pick-up device is applied to the magneto-optic disk device and the like for reading out the RF signal based on strength of the light reflected from the recording medium, the light signal which is the reconstruction signal is obtained by the following equation (4).

$$\text{Light Signal} = (i+h)+(i+d) \quad (4)$$

However, in the equations (3) and (4), h and d are not always necessary. The magneto-optic signal and the light signal are obtained by the following equations (5) and (6).

$$\text{Optical-Magnetic Signal} = i-j \quad (5)$$

$$\text{Light Signal} = i+j \quad (6)$$

Each of the photo detectors I and J for detecting the 0 order rays LI0 and LJ0, each of which is of a center at the time of detecting the RF signal, is composed of a single photo detector and not composed of the divided photo detector. Accordingly, there is an advantage that noise is hardly generated when the 0 order rays LI0 and LJ0 are detected, and hence this optical pick-up device can detect the RF signal highly sensitively.

Incidentally, in the above mentioned embodiment, although the photo detectors I and H are provided separately from each other, it is allowable that they are integrated into a single photo detector. Similarly, although the photo detectors J and D are provided separately from each other, it is allowable that they are integrated into a single photo detector.

Figure 9:
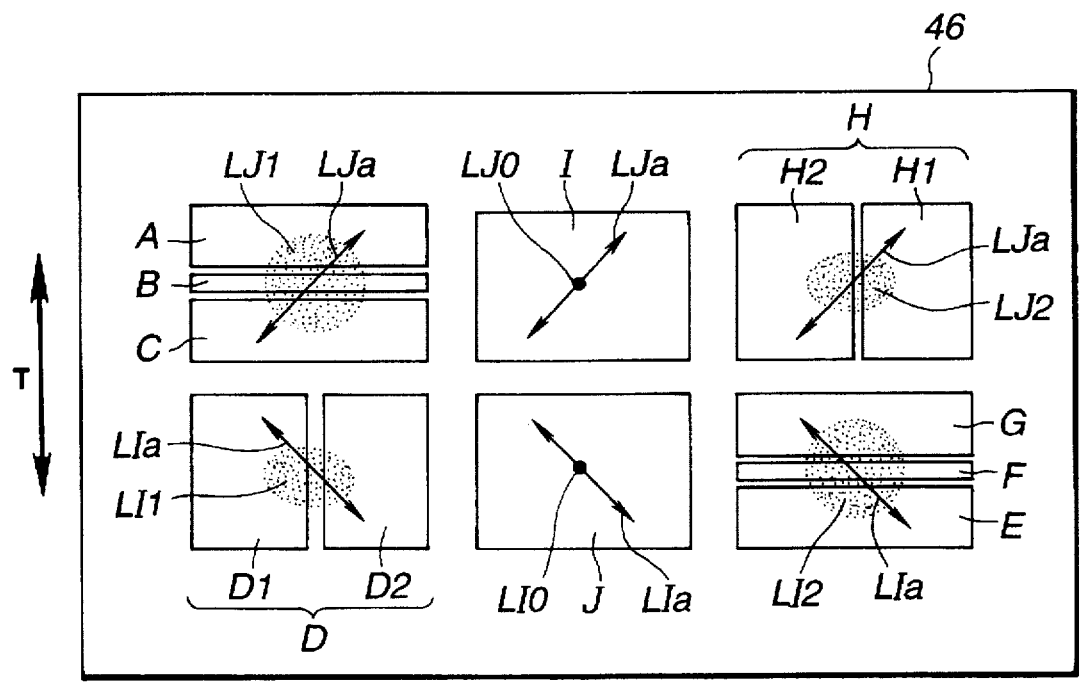
FIG. 9 is a plan view showing another example of a second light detecting device and a spot pattern.

Further, in the above mentioned embodiment, the tracking direction T of the recording medium 43 is adapted to be the separating direction of the ordinary ray LI and the extraordinary ray LJ. However, it is allowable that the tracking direction T of the recording medium 43 is adapted to be perpendicular to the separating direction of the ordinary ray LI and the extraordinary ray LJ. On this occasion, the signals except the tracking error signal can be detected similarly to the case of the above mentioned optical pick-up device. However, in order to detect the tracking error signal, it is necessary that the photo detector D is made into a two-divided photo detector composed of the photo detectors D1 and D2 and that the photo detector H is made into the two-divided photo detector composed of the photo detectors H1 and H2, as shown FIG. 9. When the light quantities detected by the photo detectors D1, D2, H1 and H2 are referred to as d1, d2, h1 and h2, respectively, the tracking error signal is obtained by the following equation (7) as the push-pull signal.

$$\text{Tracking Error Signal} = (d1-d2)+(h1-h2) \quad (7)$$

Figure 10:
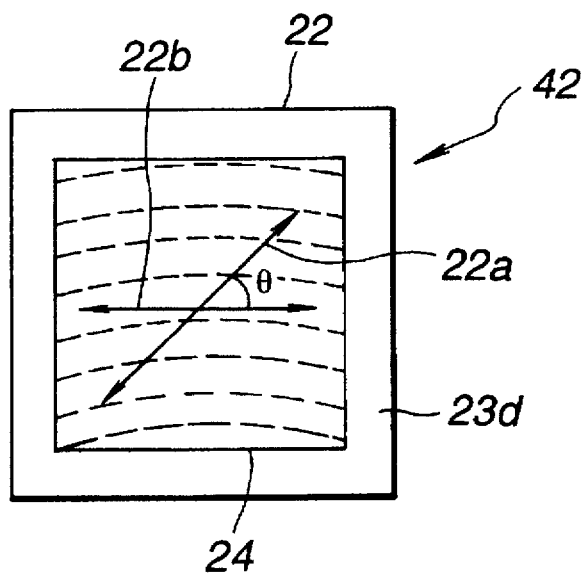
FIG. 10 is a plan view of another example of the composite prism according to the present invention, viewing from a side of the grating.
Figure 11:
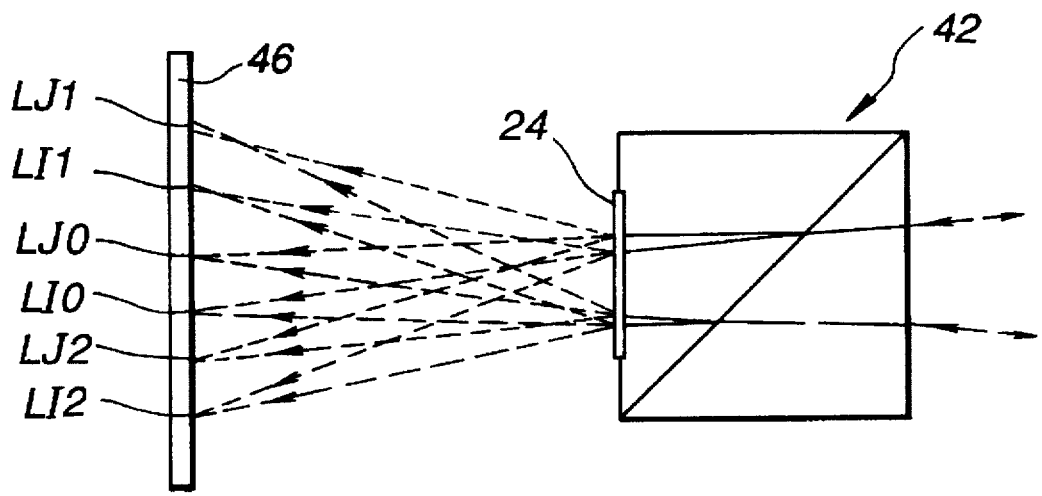
FIG. 11 is a plan view of the composite prism shown in FIG. 10, viewing from above.
Figure 12:
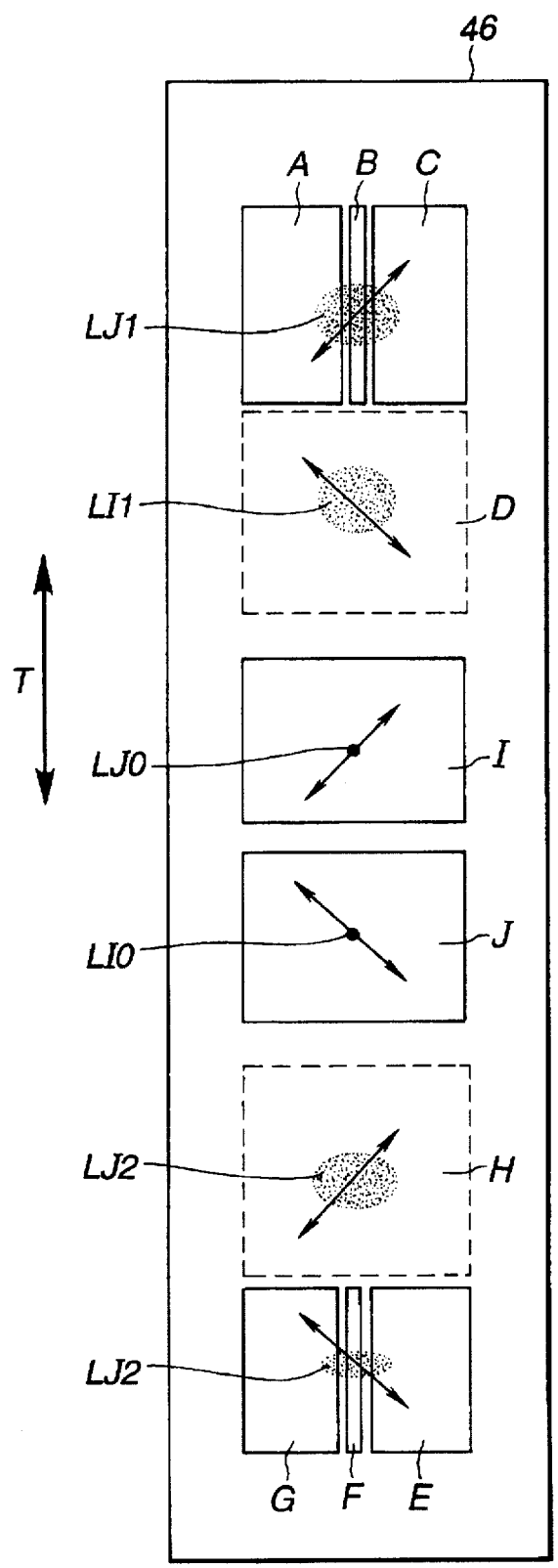
FIG. 12 is a plan view showing another example of a second light detecting device and a spot pattern.

Further, in the above mentioned embodiment, the separating direction of the ordinary ray LI and the extraordinary ray LJ is adapted to be perpendicular to the direction diffracted by the grating 24. However, as shown in FIG. 10, it is allowable that the grating 24 is rotated by 90 degrees to match the separating direction of the ordinary ray LI and the extraordinary ray LJ with the direction diffracted by the grating 24 so that the 0 order ray LI0, the + primary ray LI1 and the − primary ray LI2 of the ordinary ray LI, and the 0 order ray LJ0, the + primary ray LJ1 and the − primary ray LJ2 of the extraordinary ray LJ are emitted in a line. On this occasion, as shown in FIG. 11, the rays emitted through the grating 24 from the composite prism 42 are aligned in a line in the order of the − primary ray LI2 of the ordinary ray LI, the − primary ray LJ2 of the extraordinary ray LJ, the 0 order ray LI0 of the ordinary ray LI, the 0 order ray LJ0 of the extraordinary ray LJ, the + primary ray LI1 of the ordinary ray LI and the + primary ray LJ1 of the extraordinary ray LJ. At this time, as shown in FIG. 12, the respective photo detectors A to J in the second light detecting device 46 are arranged in a line so as to correspond to these six rays, so that the RF signal, the focusing signal and the tracking error signal can be detected similarly to the case of the above mentioned optical pick-up device. However, FIG. 12 shows an example in a case where the tracking direction T of the recording medium is adapted to be the direction in which the respective photo detectors A to J are aligned. When the tracking direction T of the recording medium is adapted to be perpendicular to the direction in which the respective photo detectors A to J are aligned, as mentioned above, it is necessary that each of the photo detectors D and H is the two-divided photo detector type.

Figure 13:
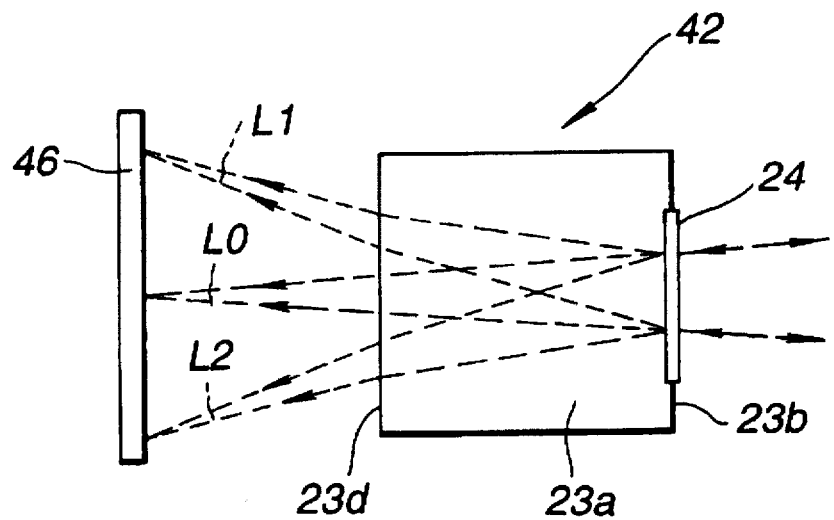
FIG. 13 is a side view showing still another example of the composite prism.
Figure 14:
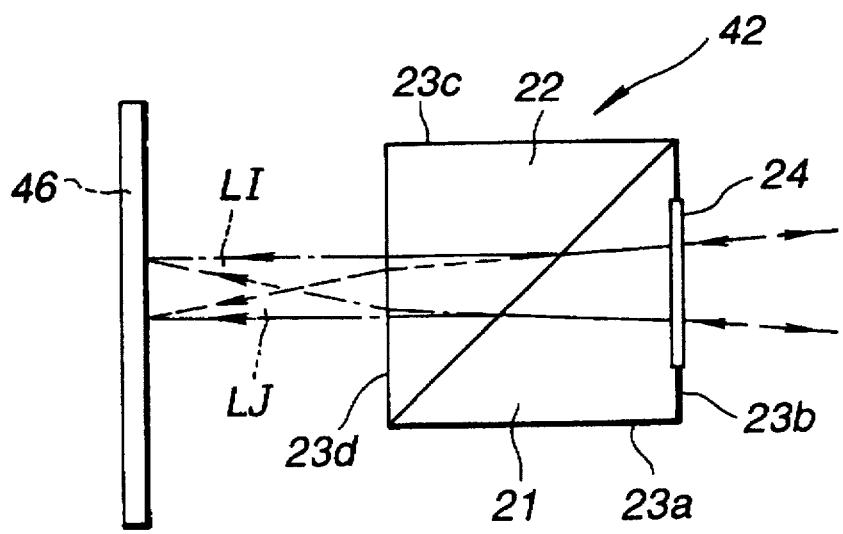
FIG. 14 is a plan view of the composite prism shown in FIG. 13, viewing from above.

Further, in the above mentioned embodiment, the grating 24 is attached to the side of the fourth plane 23d of the composite prism 42. However, it may be attached to the side of the second plane 23b as shown in FIGS. 13 and 14. On this occasion, the light reflected from the recording medium 43 is diffracted by the grating 24 and separated into the 0 order ray Lo, the + primary ray L1 and the − primary ray L2, as shown in FIG. 13. After that, as shown in FIG. 14, these three rays are separated into the ordinary ray LI and the extraordinary ray LJ, respectively, by the second rectangular prism 22. Then, they are separated into six rays similarly to the case of the above mentioned optical pick-up device.

Figure 15:
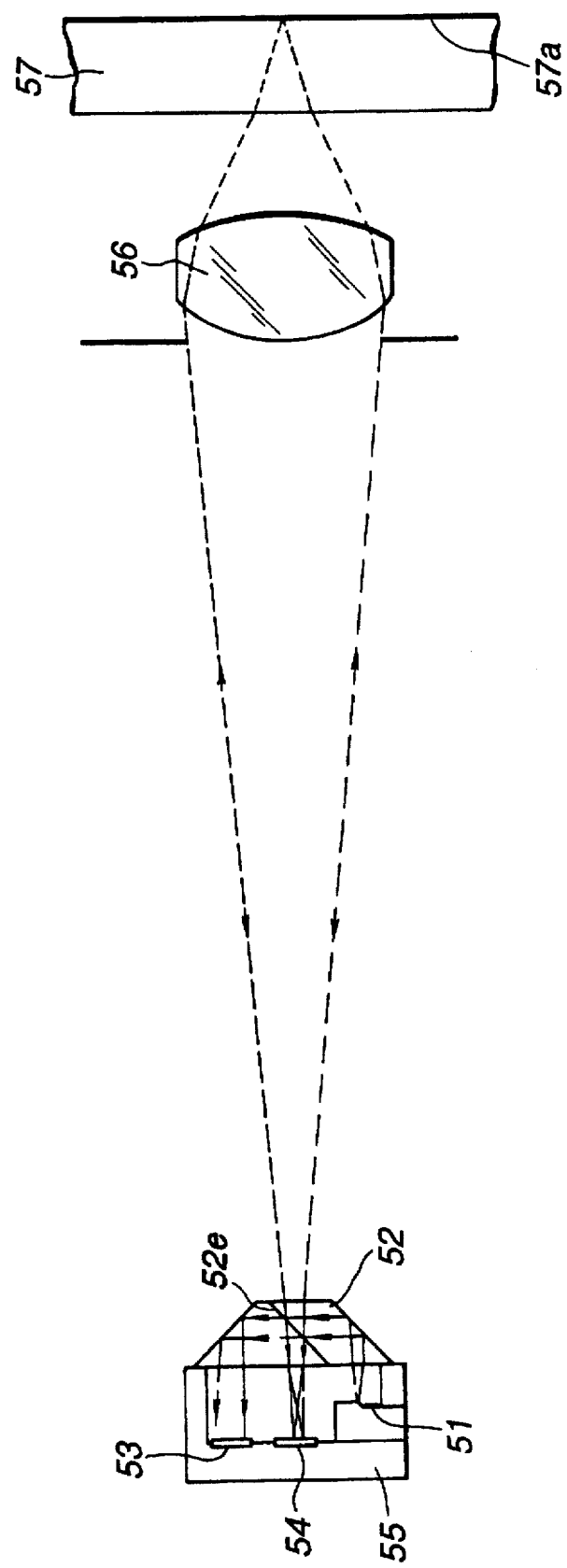
FIG. 15 is a plan view showing another constituent example of the optical pick-up device according to the present invention.

Further, in the above mentioned embodiment, although the light source 41, the composite prism 42, the first light detecting device 45 and the second light detecting device 46 are provided individually, these members may be constituted unitedly. Actually, for example, as shown in FIG. 15, a light source 51, a composite prism 52, a first light detecting device 53 and a second light detecting device 54 are attached to a single base plate 55, and then these members are integrated with each other. Hence, the light emitted from the composite prism 52 is focused on a recording surface 57a of a recording medium 57 by a lens 56 similarly to the case of the above mentioned optical pick-up device.

Figure 16:
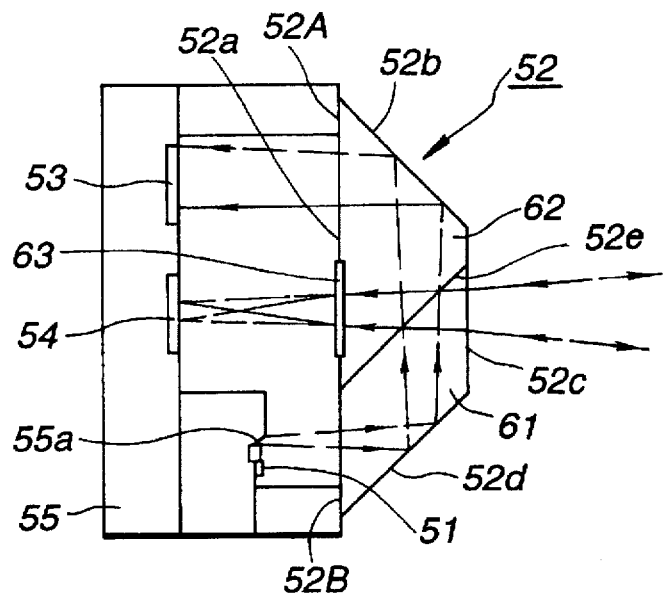
FIG. 16 is a plan view showing the optical pick-up device according to the present invention, which is enlarged in the vicinity of the composite prism.

In FIG. 16, the united member is illustrated as an enlarged drawing. As shown in FIG. 16, a shape of the composite prism 52 is trapezoidal so as to form a suitable optical path. That is, the composite prism 52 employs a parallelogram type of a first prism 61 instead of the first rectangular prism 21, and a trapezoid type of a second prism 62 instead of the second rectangular prism 22. Then, so as to make a general shape of the composite prism 52 trapezoidal, the first prism 61 is adhered to a sloping surface of the second prism 62 through polarization film 52e, and a grating 63 is attached to a location, near the first prism 61, of bottom surface 52a of the second prism 62. This trapezoid type of the composite prism 52 is attached to the base plate 55 at both ends 52A and 52B of the bottom surface 52a of the trapezoid.

The light source 51 is attached to the base plate 55 in such a manner that the laser light from the light source 51 is reflected at once at a mirror 55a on the base plate 55 and then inputted to face 52d of the first prism 61 of the composite prism 52a. Further, the first light detecting device 53 is attached to a location opposed to the sloping surface 52b of the composite prism 52 and also a side of the bottom surface 52a of the composite prism 52, on the base plate 55, for detecting the light emitted from the composite prism 52 without passing through a grating 63. On the other hand, the second light detecting device 54 is attached to a location opposed to the upper surface 52c of the composite prism 52 and also a side of the bottom surface 52a of the composite prism 52, on the base plate 55, for detecting the light emitted from the composite prism 52 through the grating 63.

In this way, when the light source 51, the composite prism 52, the first light detecting device 53 and the second light detecting device 54 are attached to the single base plate 55, and then these members are integrated with each other, the RF signal from the recording medium 57, the focusing error signal and the tracking signal can be detected similarly to the case of the above mentioned optical pick-up device.

Further, in the above mentioned embodiment, one laser light is inputted to the recording medium. However, the present invention can be applied to the so-called three spot method in which the tracking error is detected by inputting three laser lights to the recording medium.

Figure 17:
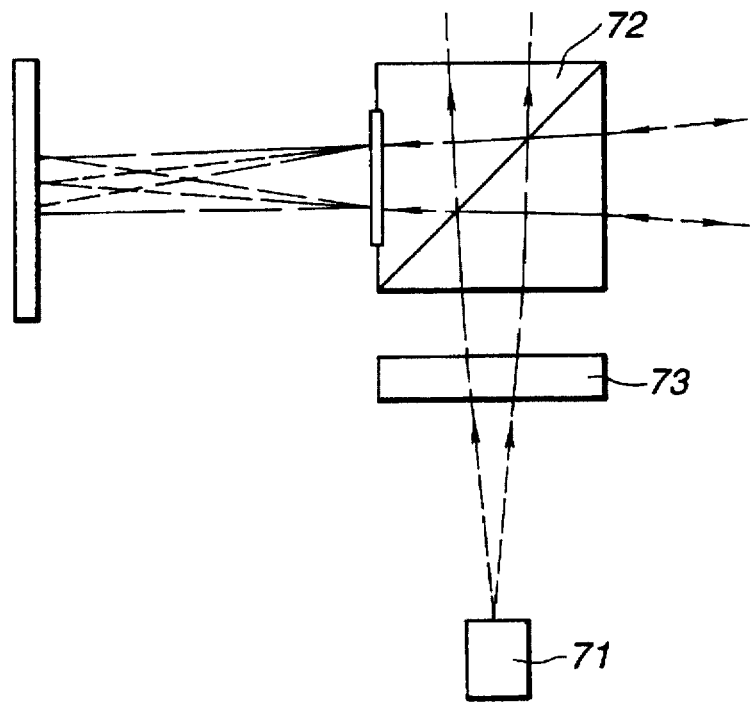
FIG. 17 is an enlarged plan view showing a main part of still another constituent example of the optical pick-up device according to the present invention.
Figure 18:
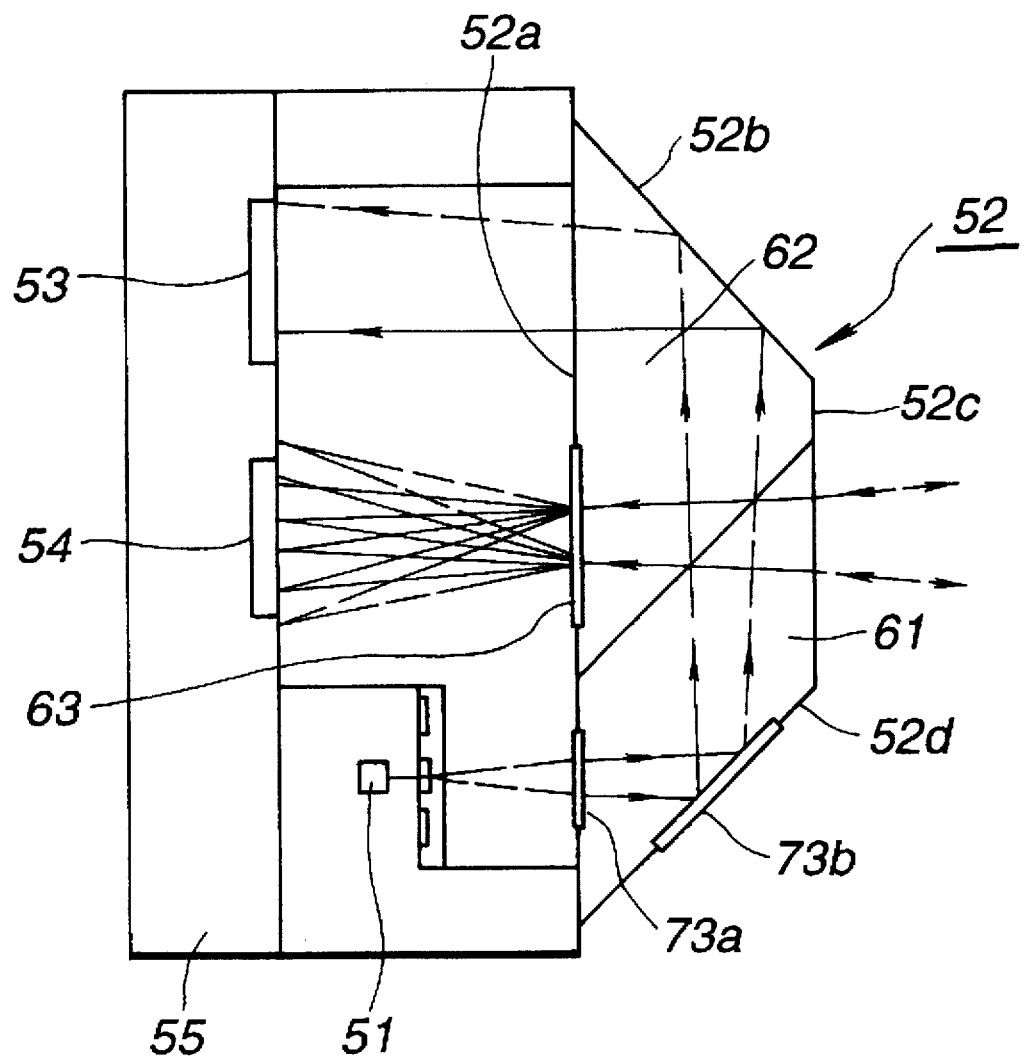
FIG. 18 is an enlarged plan view showing a main part of further another constituent example of the optical pick-up device according to the present invention.

In a case where the present invention is applied to the three spot method, fox example, as shown in FIG. 17, a second grating 73 is preferably arranged between a light source 71 and a composite prism 72. Then, the laser light is separated into the three laser lights by the second grating 73. Further, in a case where the respective members are integrated with each other as described above, the second grating is preferably arranged on an optical axis connecting the second grating to the light source and the polarization film. Actually, fox example, as shown in FIG. 18, the second grating 73a is preferably attached to a side of the first prism 61 on the bottom surface 52a of the composite prism 52, or the second grating 73b is preferably attached to the sloping surface 52d on a side of the first prism 61 of the composite prism 52.

Figure 19:
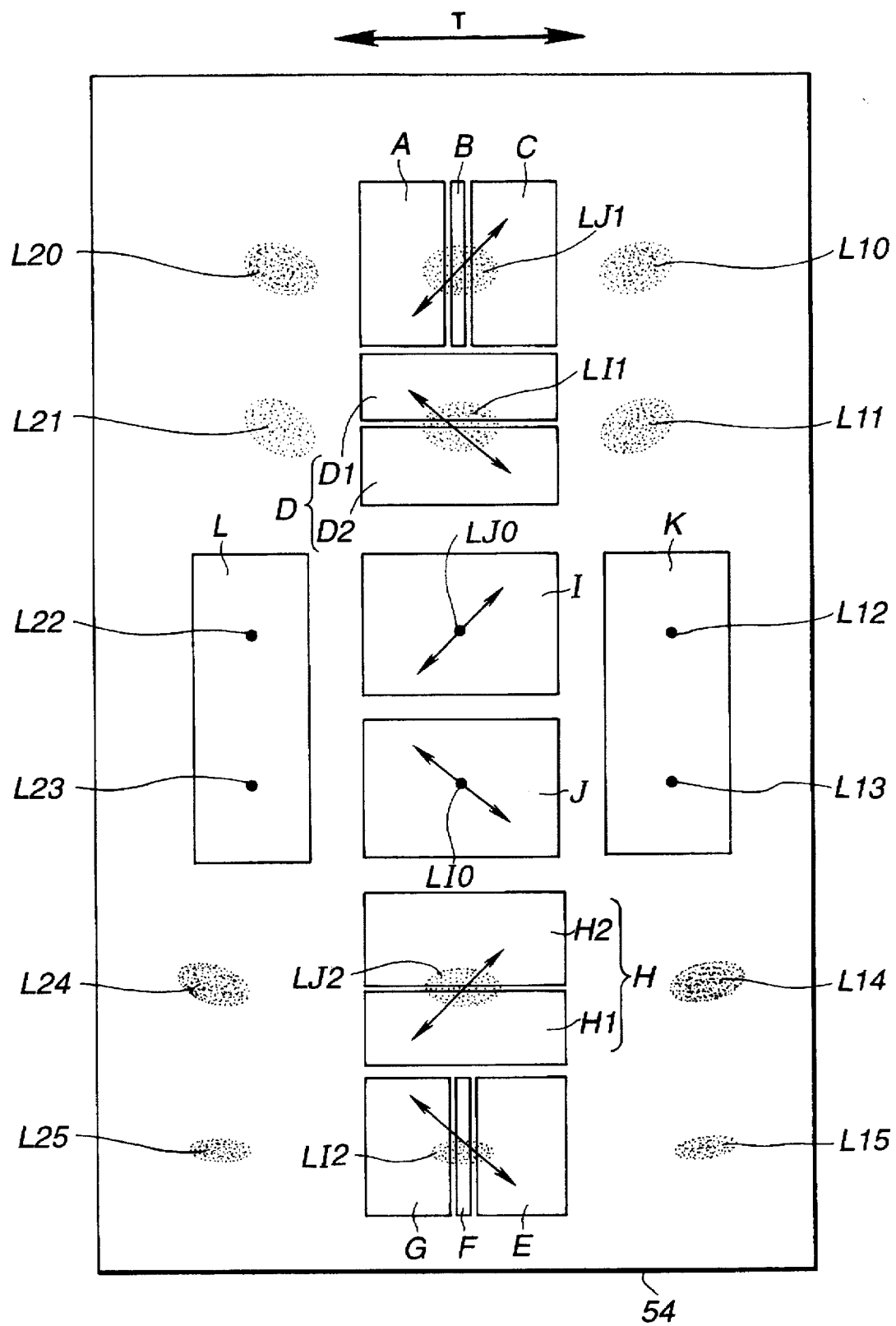
FIG. 19 is a plan view showing one example of a second light detecting device and a spot pattern, to which a three spot method is applied.

At this time, the spot pattern on the second light detecting device is as shown in FIG. 19. The separating direction of the ordinary ray and the extraordinary ray is adapted to be same as the direction diffracted by the grating 63 of the composite prism 52. The tracking direction T of the recording medium 57 is adapted to be perpendicular to this direction.

As shown in FIG. 19, the 0 order ray of the light diffracted by the second grating 73a (or 73b) is separated into the 0 order ray LI0, the + primary ray LI1 and the − primary ray LI2 of the ordinary ray, and the 0 order ray LJ0, the + primary ray LJ1 and the − primary ray LJ2 of the extraordinary ray by the composite prism 52, and inputted to the photo detectors A to J, similarly to the case of the above mentioned embodiment. The + primary ray of the light diffracted by the second grating 73a (or 73b) is separated into six rays L10, L11, L12, L13, L14 and L15 by the composite prism 52, and the − primary light is separated into six rays L20, L211, L22, L23, L24 and L25 by the composite prism 52. Then, they are inputted to both sides of the 0 order ray LI0, the + primary ray LI1, and the − primary ray LI2 of the ordinary ray, and the 0 order ray LJ0, the + primary ray LJ1 and the − primary ray LJ2 of the extraordinary ray, respectively.

On this occasion, in the second light detecting device 54, there are disposed, on both sides of the photo detectors I and J, the photo detectors K and L for detecting ± primary rays L12, L13, L22 and L23 of the light diffracted by the second grating 73a (or 73b), in addition to the above mentioned photo detectors A to J. In the example shown in FIG. 19, since the tracking direction T of the recording medium 57 is adapted to be perpendicular to the direction diffracted by the grating 63 of the composite prism 52, the photo detector D is constituted by the two-divided photo detector composed of the photo detectors D1 and D2, and the photo detector H is constituted by the two-divided photo detector composed of the photo detectors H1 and H2.

The photo detectors A to J detect the 0 order rays LI0, LI1, LI2, LJ0, LJ1 and LJ2 of the light diffracted by the second grating 73a (or 73b). Further, the photo detector K detects the 0 order ray L12 of the ordinary ray and the 0 order ray L13 of the extraordinary ray by means of the composite prism 52, in the + primary ray by means of the second grating 73a (or 73b). Furthermore, the photo detector L detects the 0 order ray L22 of the ordinary ray and the 0 order ray L23 of the extraordinary ray by means of the composite prism 52, in the − primary ray by means of the second grating 73a (or 73b).

At this time, the RF signal from the recording medium 57 and the focusing error signal are similar to the case of the above mentioned embodiment. However, as for the tracking error, it is possible to separately extract the tracking error signal and the push-pull signal. That is, when the light quantities detected by the photo detectors D1, D2, H1, H2, K and L are referred to as d1, d2, h1, h2, k and l, respectively, the tracking error signal is obtained by the following equation (8), and the push-pull signal is obtained by the following equation (9).

$$\text{Tracking Error Signal} = (k - 1) \tag{8}$$

$$\text{Push-Pull Signal} = (d1 - d2) + (h1 + h2) \tag{9}$$

As is apparent from the above explanation, the optical pick-up device in accordance with the present invention can constitute the optical system having a small number of the parts and a short optical path without employing a hologram optical element having a polarization selection property. Therefore, the present invention can provide an optical pick-up device which is miniaturized and is low in producing cost.

The present invention is not limited to the above described embodiments, but various modifications thereof can be made within the scope of the appended claims.

What is claimed is:

1. An optical pick-up device for radiating an optical beam onto a recording medium and detecting a return light reflected from the recording medium and thereby reading out a signal from said recording medium, comprising:

a light emitting means for emitting a laser light;

a polarization film;

a first optical element made of non-axial crystal material to which said light emitted from said light emitting means is inputted;

a second optical element made of uniaxial crystal material adhered to said first optical element through the polarization film;

a first detecting means for detecting the light passed through said second optical element, after the light emitted from said light emitting means is reflected on said polarization film through said first optical element, and the light reflected on said polarization film is radiated onto the recording medium, and the light reflected from said recording medium is inputted again to said first optical element and is also transmitted through said polarization film and inputted to said second optical element;

a grating disposed on an optical path of the light reflected from said recording medium; and a second detecting means wherein the light emitted from said light emitting means is passed through said first optical element and the light transmitted through said polarization film is radiated through said second optical element.

2. An optical pick-up device as defined in claim 1, wherein said first optical element is shaped as a parallelogram, and said second optical element is shaped as a trapezoid.

3. An optical pick-up device as defined in claim 1, wherein said first detecting means and said second detecting means are disposed on a same plane.

4. An optical pick-up device as defined in claim 1, wherein said optical pick-up device further comprises a second grating disposed in an optical path of said first optical element.

5. An optical pick-up device as defined in claim 1, wherein the second detecting means detects respective 0 order rays, respective + primary rays and respective − primary rays which are separated through said second optical element and diffracted through the grating and comprises:

a photo detector for detecting the 0 order ray of an ordinary ray;

a photo detector for detecting the 0 order ray of an extraordinary ray;

a three-divided photo detector for detecting the − primary ray of the ordinary ray; and a three-dividend photo detector for detecting the + primary ray of the extraordinary ray.

6. An optical pick-up device as defined in claim 5, wherein said second detecting means further comprises a two-divided photo detector for detecting the + primary ray of said ordinary ray, and a two-divided photo detector for detecting the − primary ray of said extraordinary ray.

7. An optical pick-up device as defined in claim 1, wherein said grating is arranged on said first optical element.

8. An optical pick-up device as defined in claim 1, wherein said grating is arranged on said second optical element.

9. An optical pick-up device for radiating an optical beam onto a recording medium and detecting a return light reflected from the recording medium and thereby reading out a signal from said recording medium, comprising:

a light emitting means for emitting a laser light;

a polarization film;

a first optical element made of non-axial crystal material to which the light emitted from said light emitting means is inputted;

a second optical element made of uniaxial crystal material adhered to said first optical element through the polarization film;

a grating for diffracting an extraordinary ray and an ordinary ray, after the light reflected on the polarization film through said first optical element is radiated onto the recording medium, and also the light reflected from said recording medium is inputted again to said polarization film through said first optical element, and transmitted through said polarization film and inputted to said second optical element, and then separated into the extraordinary ray and the ordinary ray through said second optical element;

a first detecting means for detecting a 0 order ray, a + primary ray and a − primary ray which are diffracted through said grating; and a second detecting means wherein the light emitted from said light emitting means is radiated through said first optical element and the light transmitted through said polarization film is radiated through said second optical element.

10. An optical pick-up device as defined in claim 9, wherein said first optical element is shaped as a parallelogram, and said second optical element is shaped as a trapezoid.

11. An optical pick-up device as defined in claim 9, wherein said first detecting means and said second detecting means are disposed on a same plane.

12. An optical pick-up device as defined in claim 9, wherein said optical pick-up device comprises a second grating disposed in an optical path of said first optical element.

13. An optical pick-up device as defined in claim 9, wherein said second detecting means detects respective 0 order rays, respective + primary rays and respective − primary rays which are separated through said second optical element and diffracted through the grating and comprises:

a photo detector for detecting the 0 order ray of an ordinary ray;

a photo detector for detecting the 0 order ray of an extraordinary ray;

a three-dividend photo detector for detecting the − primary ray of the ordinary ray; and a three-dividend photo detector for detecting the + primary ray of the extraordinary ray.

14. An optical pick-up device as defined in claim 13, wherein said second detecting means further comprises a two-divided photo detector for detecting the + primary ray of said ordinary ray, and a two-divided photo detector for detecting the − primary ray of said extraordinary ray.

* * * * *